United States Patent [19]
Matsushita et al.

[11] Patent Number: 5,680,650
[45] Date of Patent: Oct. 21, 1997

[54] CAMERA HAVING INTERNAL SUPPORT STRUCTURE FOR RED-EYE PREVENTION LAMP

[75] Inventors: Takeshi Matsushita; Shigeru Morishita, both of Tokyo, Japan

[73] Assignee: Asahi Kogaku Kogyo Kabushiki Kaisha, Tokyo, Japan

[21] Appl. No.: 569,004

[22] Filed: Dec. 7, 1995

[30] Foreign Application Priority Data

Dec. 19, 1994 [JP] Japan ................... 6-015625

[51] Int. Cl.⁶ .................... G03B 7/00; G03B 17/02
[52] U.S. Cl. ................. 396/157; 396/158; 396/535
[58] Field of Search ................. 354/148, 149.1, 354/149.11, 288, 415; 396/155, 157, 158, 439, 542, 535

[56] References Cited

U.S. PATENT DOCUMENTS

| | | | |
|---|---|---|---|
| 3,964,078 | 6/1976 | Kurei et al. | 354/152 |
| 4,148,573 | 4/1979 | Yamanaka | 354/145 |
| 4,896,178 | 1/1990 | Ohmura et al. | 354/145.1 |
| 4,926,207 | 5/1990 | Eguchi et al. | 354/484 |
| 5,019,845 | 5/1991 | Asakura et al. | 354/149.1 |
| 5,028,943 | 7/1991 | Ishii et al. | 354/145.1 |
| 5,040,010 | 8/1991 | Arai | 354/288 |
| 5,079,584 | 1/1992 | Nakamura | 354/484 |
| 5,262,809 | 11/1993 | Nishimura et al. | 354/132 |
| 5,426,478 | 6/1995 | Katagiri et al. | 354/149.11 |

*Primary Examiner*—Safet Metjahic
*Assistant Examiner*—Eddie C. Lee
*Attorney, Agent, or Firm*—Greenblum & Bernstein, P.L.C.

[57] ABSTRACT

An electronic part, specifically a red-eye prevention lamp, is suspended in a gap between immediately adjacent curved internal walls of a camera. The curved internal walls are those of a battery compartment and a film storage compartment. The red-eye prevention lamp is suspended by a control circuit board bridging the curved walls.

15 Claims, 2 Drawing Sheets

CAMERA HAVING INTERNAL SUPPORT STRUCTURE FOR RED-EYE PREVENTION LAMP

BACKGROUND OF THE INVENTION

The present invention relates to the internal structure of compact cameras, and more particularly, to the arrangement of electronic parts (for example, a red-eye prevention lamp) in a camera.

"Red-eye" prevention lamps, used in a few modern compact cameras, are fairly large and difficult to arrange. The "red-eye" phenomena occurs when a strobe flash is close to a photographing lens. Since the pupils of the eyes of the photographing subject are usually relatively dilated, when the strobe flashes, a relatively large proportion of the flash light is reflected straight back to the photographing lens by the retinas of the subject. Since the retina is rich in blood vessels, the pupils of the eyes of the photographing subject appear to be red, giving the "red-eye" phenomena. One solution to this problem is to provide a bright red-eye prevention lamp on the camera. For a period prior to the flash of the strobe and the exposure, the red-eye prevention lamp is illuminated. The pupils of the photographing subject contract in response to the bright illumination of the red-eye prevention lamp, and when the strobe flashes during the exposure, the pupils of the subject or subjects are already contracted. The red-eye phenomena is thereby reduced.

Conventionally, compact cameras are constructed to be held in the right hand, having a right handed grip with the shutter release button placed on the grip. If a strobe is provided, the strobe is almost invariably placed on the opposite (left hand) side, so that the user's operating (right) hand does not interfere with the strobe illumination. The strobe is also placed as far as possible from the lens so that the tendency for the red-eye phenomena is minimized. If a red-eye prevention lamp is provided, it is also provided on the (left hand) side opposite the grip, again so that the user's hand does not interfere with the illumination therefrom.

However, a red-eye prevention lamp is a fairly large electronic part, often a light valve, and typically requires extra space and a support structure for its accommodation in the camera, on the side opposite the grip (and shutter release button). Furthermore, a control circuit board for driving the red-eye prevention lamp must also be accommodated. Therefore, a camera having a red-eye reduction lamp is larger by virtue of that extra space. It is therefore difficult to miniaturize a camera having a red-eye reduction lamp.

SUMMARY OF THE INVENTION

It is therefore an object of the invention to provide a camera capable of accommodating the electronic parts of the camera, particularly a red-eye prevention lamp, without increasing the size of the camera.

In order to meet the objects of the invention, an improved camera includes a housing, including a front decorative wall. The front decorative wall has an illumination opening formed therein. A cylindrical battery compartment having a first curved wall. A cylindrical film holding compartment has a second curved wall immediately adjacent and curving away from the first curved wall. The first and second curved walls are arranged opposite the front decorative wall and each other to form a space therebetween. A member bride the two curved walls to suspend a red-eye prevention lamp to emit light through the illumination opening. Thus, the red-eye prevention lamp is suspended between curved walls formed by cylindrical compartments necessary in the camera to emit light through the illumination opening without any particular molding of the camera body.

Preferably, the member includes a control circuit board secured to the two compartment walls. The control circuit board supports the red-eye prevention lamp. In this manner, the control circuit board supports the illumination source in exactly the right position to illuminate external subjects through the illumination opening while also serving as a support for the control circuit of the illumination source. The control circuit board preferably includes a control circuit for driving the red-eye prevention lamp.

Further preferably, the control circuit board has a mounting hole formed therethrough, and the red-eye prevention lamp penetrates the mounting hole extending in the direction of the illumination opening formed through the front decorative wall of the housing. The mounting hole allows the control circuit board and red-eye prevention lamp to share the same space in mutually perpendicular directions.

Still further preferably, the red-eye prevention lamp is suspended within a space defined by the front decorative wall, the first curved wall, and the second curved wall. The red eye-prevention lamp is thereby positioned in the camera without requiring a particular molding of the camera body, and is positioned advantageously in a space created by the cylindrical internal surfaces.

In a further development, the camera further includes a shutter release button on a right side of the camera, and the battery compartment and the red-eye prevention lamp are on a left side of the camera. In this manner, the space is provided opposite the shutter release, where the camera is held, and the red-eye prevention lamp is arranged such that the operator's hand will not interfere with the red-eye prevention lamp's illumination.

According to another aspect of the invention, a camera includes a front decorative wall. The front decorative wall has an illumination opening formed therein. A cylindrical battery compartment has a first curved wall. A cylindrical film holding compartment has a second curved wall immediately adjacent and curving away from the first curved wall. The first and second curved walls are arranged opposite the front decorative wall and each other to form a space therebetween. A bridging member bridges the two curved walls. A bridging member is substantially parallel to the front decorative wall and has a mounting hole formed therein. The mounting hole is formed at a position aligned with the illumination opening. A red-eye prevention lamp mounted in the mounting hole and suspended by the bridging member. The red-eye prevention lamp extends in the direction of the illumination opening to illuminate a subject outside front decorative wall. This allows the red-eye prevention lamp to be positioned at the illumination hole to illuminate external subjects, and does not require any special mounting of the red-eye prevention lamp beyond that described.

Preferably, the bridging member includes a control circuit board bridging the two internal walls. The control circuit board suspends the red-eye prevention lamp. The control circuit board may include a control circuit for driving the red-eye prevention lamp. By suspending the red-eye prevention lamp by its own control circuit board, the circuit board serves both to hold the red-eye prevention lamp in the spacing and a board to support the control circuit.

Further preferably, the bridging member is substantially tangent to each of the curved walls. This enables the bridging member to be easily supported.

Still further preferably, the red-eye prevention lamp is suspended within a space defined by the front decorative wall and the first and second curved walls. In this manner, the full depth of the spacing is taken advantage of, and the red-eye prevention lamp is securely attached to the board.

According to one preferred arrangement of the camera, a shutter release button is provided on a right side of the camera, the battery compartment and the red-eye prevention lamp are on a left side of the camera. In this manner, the spacing is provided opposite the shutter release, where the camera is held, and the red-eye prevention lamp is arranged such that the operator's hand will not interfere with the red-eye prevention lamp's illumination.

According to still another aspect of the invention, a camera includes a housing with a front decorative wall. A cylindrical battery compartment is disposed inside the housing. The battery compartment has a first curved wall. A cylindrical film holding compartment is disposed inside the housing, and has a second curved wall immediately adjacent and curving away from the first curved wall. A red-eye prevention lamp is housed in a space defined by the front decorative wall, the first curved wall, and the second curved wall. Thus, positioning of the red-eye prevention lamp takes special advantage of the spacing created between two curved walls created by the necessary cylindrical compartments in the camera.

Preferably, the camera further includes a control circuit board secured to at least one of the first and second curved walls and extends between the first and second curved walls. The control circuit board supports the red-eye prevention lamp. Accordingly, both the control circuit board and the red-eye prevention lamp are suspended in the spacing.

In one preferred development, the front decorative wall has an illumination opening formed therethrough for illumination from the red-eye prevention lamp to exit the housing. The control circuit board has a mounting hole formed therethrough. The red-eye prevention lamp penetrates the mounting hole extending in the direction of the illumination opening of the front decorative wall. In this development, the red-eye prevention lamp is advantageously positioned at the illumination opening by the positioning of the mounting hole, and can extend both into the spacing and toward the illumination hole by virtue of the mounting hole.

Preferably, a shutter release button is provided on a right side of the camera, and the battery compartment and the red-eye prevention lamp are on a left side of the camera. In this manner, the spacing is provided opposite the shutter release, where the camera is held, and the red-eye prevention lamp is arranged such that the operator's hand will not interfere with the red-eye prevention lamp's illumination.

DETAILED DESCRIPTION OF THE PREFERRED EMBODIMENTS

Figure 1:
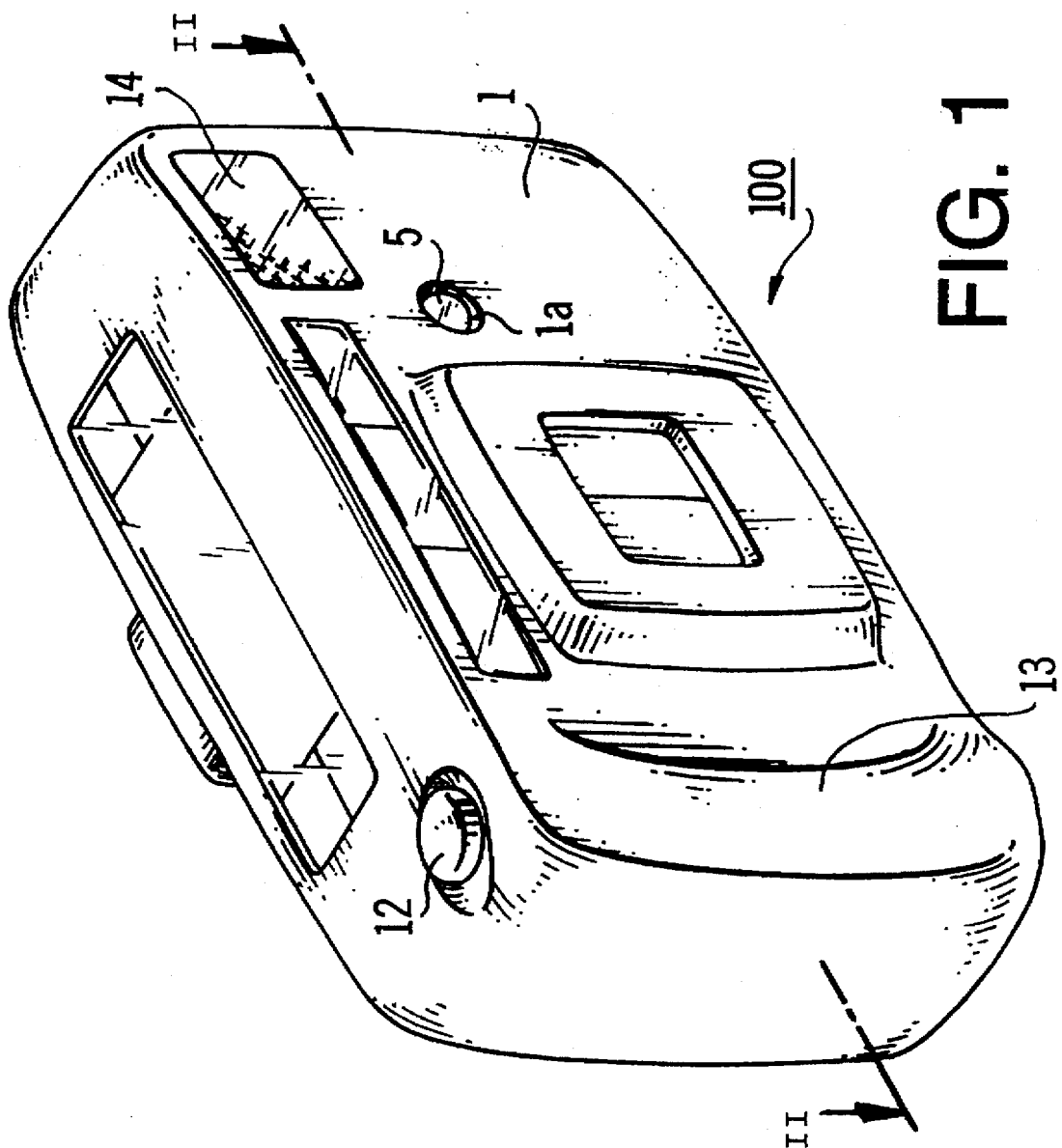
FIG. 1 is a perspective view of an embodiment of a camera to which the present invention is applied.

FIG. 1 is a perspective view of a camera 100 according to the present invention. The camera 100 has conventional flash exposure and film travel apparatus, and circuitry for controlling both. A red eye prevention lamp 5 emits light through an illumination opening 1a in the front decorative wall 1 of the camera 100. A strobe flash 14 is placed on a side of the camera 100 opposite a grip 13 and shutter release button 12.

Figure 2:
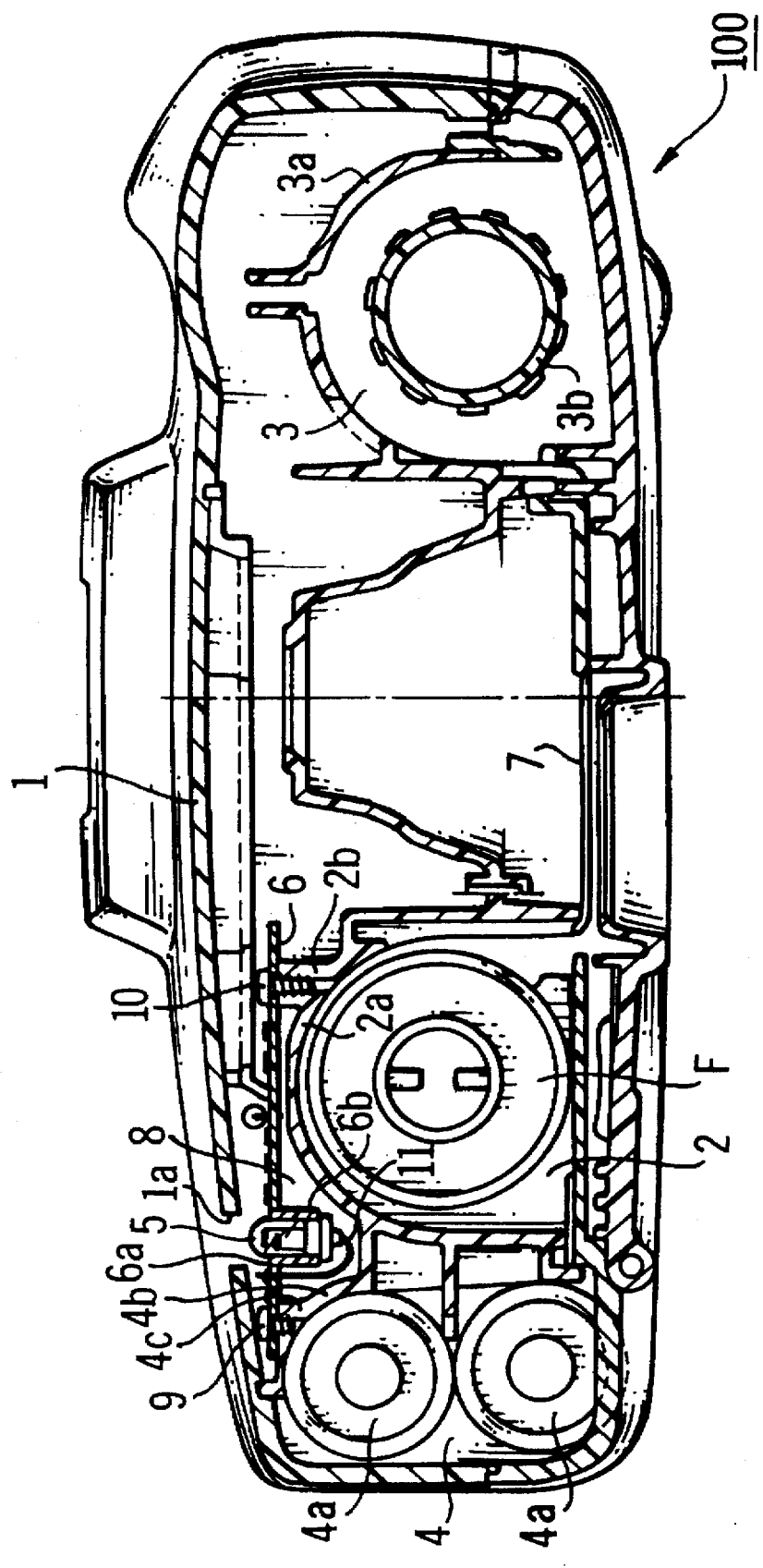
FIG. 2 is a longitudinal sectional view of an internal structure of a camera according to an embodiment of the invention, taken along the section line II—II of FIG. 1.

FIG. 2 is a longitudinal sectional view of the camera 100, taken along the section line II—II of FIG. 1. As shown in FIG. 2, the body of the camera includes the front decorative wall 1, a film canister compartment 2, a spool compartment 3, and a battery compartment 4. The battery compartment 4 is shaped to accommodate two cylindrical batteries 4a, side by side. The batteries 4a provide power for various electronic parts in the camera. The film canister compartment 2 is shaped to accommodate a cylindrical film canister F. A roll film wound inside the film canister F is drawn past an exposure frame 7 and wound by a spool 3b in the spool compartment 3. The spool compartment 3 is also cylindrical to accommodate the winding film. Both spool compartment 3 and film canister compartment 2 are hereinafter designated as film holding compartments. The spool 3b in the spool compartment 3 is driven by a motor (not shown) to wind the film frame by frame. A rewinding shaft having a coupling (not shown) is provided in the film canister compartment 2, and is driven by the motor. When the film in the film canister F is completely exposed, the motor is rotated in reverse to rewind the film into the film canister F.

In a camera having a cylindrical battery built in or inserted, internal walls of the camera, such as compartment walls of a battery compartment, film canister compartment or a spool compartment, are each at least partially cylindrical. In this embodiment, as shown in FIG. 2, the battery compartment 4 has a roughly quarter-cylindrical compartment wall 4b, and the film canister compartment 2 has a roughly half-cylindrical compartment wall 2a. That is, the compartment walls 4b and 2a are arc-shaped in cross-section. The spool compartment 3 is also has a roughly half-cylindrical compartment wall 3a, also arc-shaped in cross-section. In this embodiment, the battery compartment 4 and film canister compartment 2 are adjacent to each other. The adjacent partly cylindrical compartment walls 4b and 2a, in cooperation with the front decorative wall 1, form a spacing 8. In other words, since at least a portion of each of the partly cylindrical compartment walls 4b and 2a is non-parallel, or extend in a direction transverse, to the front decorative wall 1, a spacing 8 is formed.

In this embodiment, predetermined electronic parts of the camera, particularly the red-eye prevention lamp 5 and the control circuit for driving the red-eye prevention lamp 5, are advantageously arranged in the spacing 8. Since the user's hand should not interfere with the illumination from the red-eye prevention lamp 5, as shown in FIGS. 1 and 2, the spacing 8 is therefore formed on the side of the camera 100 opposite the grip 13 and shutter release button 12, and therefore the battery compartment 4 is placed on the side opposite the grip 13 and shutter release button 12 to create the spacing 8 in the appropriate position.

More particularly, as shown in FIG. 2, supporting portions 4c and 2b are formed on the compartment walls 4b and 2a, respectively. A control circuit board 6 for driving the red-eye prevention lamp 5 bridges the space between the two supporting portions 4c and 2b, and is substantially tangent to the partly cylindrical compartment outer walls 4b and 2a. Thus, the control circuit board 6 serves a bridging member, bridging the space 8 between the walls 4b and 2a and the front decorative wall 1. Alternatively, the control circuit board 6 is supported on only one side in cantilever fashion while bridging the space 8. The circuit board 6 is fixed to the supporting portions 4c and 2b by pins 9 and 10, respectively. A mounting hole 6a is formed in the control circuit board 6 for mounting a lamp supporting sleeve 6b. The red-eye prevention lamp 5 is inserted into the lamp supporting sleeve 6b, and the lamp 5 and the control circuit board 6 are connected by a wire 11. The illumination opening 1a allows the red-eye prevention lamp 5, an illumination source, to illuminate the photographing subject. For this purpose, the illumination opening 1a is formed in the front decorative wall 1 at a predetermined position to which the red-eye prevention lamp 5 and mounting hole 6a are aligned. In the aforementioned embodiment, the battery compartment 4 is arranged adjacent to the film canister compartment 2. However, since the compartment wall 3a in the spool compartment 3 also is an arc-shaped compartment wall 3a, the battery compartment 4 may instead be formed adjacent to the spool compartment 3 without departing from the spirit or scope of the invention. Furthermore, electronic parts other than the red-eye prevention lamp 5 may be accommodated in the spacing 8.

Thus, according to the invention, relatively large electronic parts, particularly including a red eye prevention lamp 5, can be accommodated in the camera 100 without increasing the overall size of the camera 100. Space inside the camera 100 that is conventionally wasted is utilized, and conventionally functionless surfaces become supports.

Accordingly, both the red-eye prevention lamp 5 and the control circuit board 6 for the same are suspended in the space. The red eye-prevention lamp 5 is thereby positioned in the camera 100 without requiring a particular molding of the camera body, and is positioned advantageously in a spacing 8 created by the cylindrical internal surfaces. The control circuit board 6 for driving the lamp 5 supports the red-eye prevention lamp 5 in exactly the right position to illuminate external subjects through the illumination opening 1a while also serving as a support for the control circuit of the red-eye prevention lamp 5. Particularly, by aligning the mounting hole 6a with the illumination opening 1a and positioning the control circuit board 6 appropriately, the red-eye prevention lamp 5 may be precisely positioned in front of the illumination opening 1a.

The present disclosure relates to subject matter contained in Japanese Utility Model Application No. HEI 06-015625, filed on Dec. 19, 1994, which is expressly incorporated herein by reference in its entirety.

What is claimed is:

1. A camera, comprising:

a housing, including a front decorative wall, said front decorative wall having an illumination opening formed therein;

a battery compartment having a first curved wall;

a film holding compartment having a second curved wall immediately adjacent and curving away from said first curved wall, both of said first and second curved walls opposing said front decorative wall and each other to form a space therebetween;

a red-eye prevention lamp; and a member bridging said space between said first and second curved walls, for suspending said red-eye prevention lamp in said space to emit light through said illumination opening.

2. The camera according to claim 1, wherein said member includes a control circuit board secured to said first and second compartment walls, said control circuit board supporting said red-eye prevention lamp.

3. The camera according to claim 2, wherein said control circuit board includes a control circuit for driving said red-eye prevention lamp.

4. The camera according to claim 3, wherein said control circuit board has a mounting hole formed therethrough, and said red-eye prevention lamp penetrates said mounting, and extends in a direction of said illumination opening formed through said front decorative wall of said housing.

5. The camera according to claim 1, wherein said red-eye prevention lamp is suspended within a space defined by said front decorative wall, said first curved wall, and said second curved wall.

6. The camera according to claim 1, further comprising:

a shutter release button on a right side of said camera, and said battery compartment and said red-eye prevention lamp being on a left side of said camera.

7. A camera, comprising:

a housing, including a front decorative wall, said front decorative wall having an illumination opening formed therein;

a battery compartment having a first curved wall;

a film holding compartment having a second curved wall immediately adjacent and curving away from said first curved wall, said first and second curved walls opposing said front decorative wall and each other to form a space therebetween;

a bridging member bridging said space between said first and second curved walls, said bridging member extending parallel to said front decorative wall and having a mounting hole form therein, said mounting hole being aligned with said illumination opening; and a red-eye prevention lamp mounted in said mounting hole and suspended by said bridging member in said space, said red-eye prevent lamp extending in a direction of said illumination opening to illuminate a subject outside said front decorative wall of said housing.

8. The camera according to claim 7, wherein said bridging member includes a control circuit board bridging said first and second walls, said control circuit board suspending said red-eye prevention lamp.

9. The camera according to claim 8, wherein said control circuit board includes a control circuit for driving said red-eye prevention lamp.

10. The camera according to claim 9, wherein said bridging member is extends tangentially to said first and second curved walls.

11. The camera according to claim 7, wherein said red-eye prevention lamp is suspended within said space defined by front decorative wall and said first and second curved walls.

12. The camera according to claim 7, further comprising:

a shutter release button on a right side of said camera, and said battery compartment and said red-eye prevention lamp being on a left side of said camera.

13. A camera comprising:

a housing including a front decorative wall;

a battery compartment inside said housing, said battery compartment having a first curved wall;

a film holding compartment inside said housing, having a second curved wall immediately adjacent and curving away from said first curved wall;

a red-eye prevention lamp housed in a space defined by said front decorative wall, said first curved wall, and said second curved wall; and a control circuit board, secured to at least one of said first and second curved walls, and extending between said first and second curved walls, said control circuit board supporting said red-eye prevention lamp.

14. The camera according to claim 13, wherein said front decorative wall has an illumination opening formed therethrough for illumination from said red-eye prevention lamp to exit said housing, and wherein said control circuit board has a mounting hole formed therethrough, and said red-eye prevention lamp penetrates said mounting hole extending in a direction of said illumination opening of said front decorative wall.

15. The camera according to claim 13, further comprising:

a shutter release button on a right side of said camera, and said battery compartment and said red-eye prevention lamp being on a left side of said camera.

* * * * *